June 1, 1926.
F. PAMPINELLA
YIELDING STOP FOR TAIL GATES
Filed March 28, 1924
1,586,532
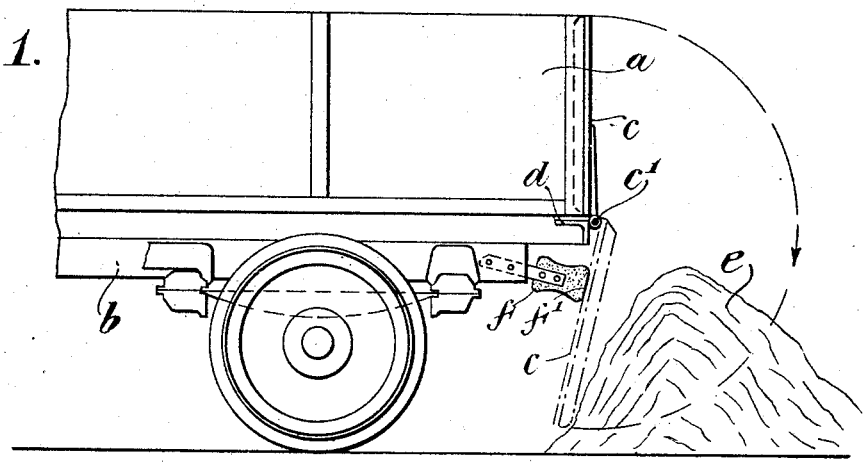
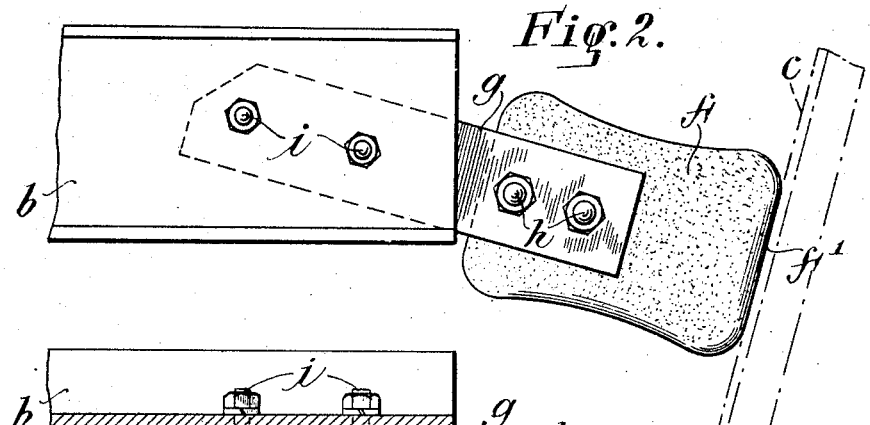
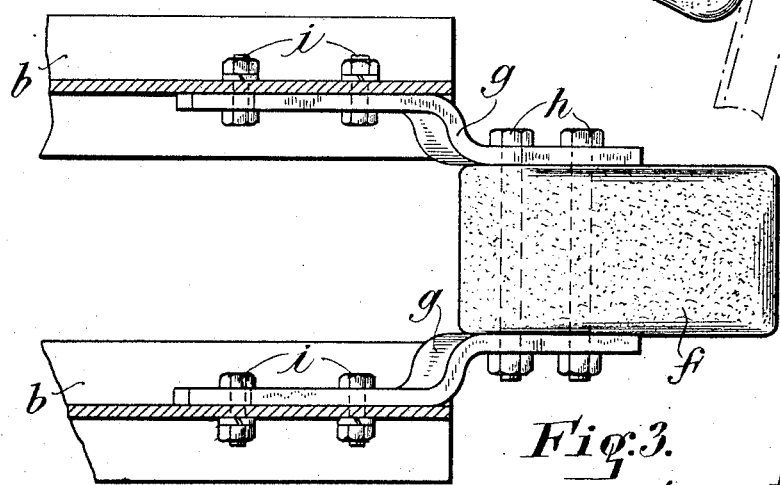
INVENTOR
Frank Pampinella
BY
Redding, Greeley, O'Shea & Campbell
ATTORNEYS Patented June 1, 1926.

1,586,532

UNITED STATES PATENT OFFICE.

FRANK PAMPINELLA, OF BROOKLYN, NEW YORK, ASSIGNOR TO INTERNATIONAL MOTOR COMPANY, OF NEW YORK, N. Y., A CORPORATION OF DELAWARE.

YIELDING STOP FOR TAIL GATES.

Application filed March 28, 1924. Serial No. 702,511.

This invention relates to stops for tail gates and particularly for yielding stops designed for application to motor vehicles having dump bodies. The usage now given tail gates in this type of vehicle results in severe strains during the dumping operation and usually some bending of the tail gate itself so that permanent injury often preventing the securing of the gate follows. It is the practice of drivers in completing the dumping operation with the tail gate down, to back the vehicle rapidly until the gate engages the pile of material and there imparts a jar or vibration to the body to complete the ejection of material. Such sudden strains force the tail gate back against fixed parts of the chassis and bend it. The principal object of the present invention is to provide yielding stops for the tail gate which are of such form and composition and so disposed as to check the rearward movement of the tail gate in the most effective manner and provide therefor a substantial yielding backing so that sudden blows on the tail gate are cushioned, and it is prevented from engaging any other part of the chassis than the stops therefor. The improved stops afford a large superficial bearing area and engage the tail gate at such distance from the pivot point as to best resist strains. The application of the invention will appear more particularly hereinafter in connection with the detailed description of the illustrated embodiment shown in the drawings, in which:

Figure 1 is a view showing conventionally the application of the improved stops to the chassis of a motor vehicle provided with a dump body, the open position of the tail gate being indicated in dotted lines.

Figure 2 is an enlarged detail view in side elevation of one of the stops.

Figure 3 is a view in plan of the stop shown in Figure 2 and illustrating the brackets for supporting it on the chassis frame.

While the invention is not to be limited in its application to a vehicle body of any particular type it will find its greatest usefulness in dump bodies because of the practices among drivers thereof now prevailing which impose injurious strains on the tail gates. As shown in Figure 1 a dump body $a$ is mounted on the chassis of a vehicle having side frame members formed as I-beams $b$ arranged in pairs at each side of the vehicle. Channel frames or other types of frame members may be employed. The body $a$ has a tail gate $c$ hinged at $c'$ at the rear end of the floor of the body where there is secured a transverse angle piece $d$ for structural reasons. Heretofore, the tail gate $c$ which is of heavy construction has had no limit stop so that when let down it would assume, by gravity, its natural position of rest which is about that indicated in dotted lines in Figure 1. If forced further rearwardly, as by backing the vehicle towards the pile of material $e$, previously discharged, the tail gate might be moved against the angle piece $d$ and if sufficient force were applied a distinct bend in the gate might be imposed. The over-hang of the gate between the angle piece $d$ and its edge is to be noticed in Figure 1, as indicating that such a result might very commonly follow. In accordance with the present invention it is proposed to mount yielding stops on the vehicle frame in such relation to the tail gate as to limit its rearward movement and cushion it against injurious strains even when the vehicle is backed towards the material pile $e$ and pressure thereby impressed on the gate. Such stops in the preferred embodiment comprise relatively large blocks $f$ of yielding material shown as rubber which present a relatively large superficial bearing surface to the tail gate. It is proposed in the preferred construction to mount one of these stops at each side of the vehicle frame. Where pairs of side frame members $b$ are disposed at each side of the vehicle frame, each stop may be mounted conveniently by means of brackets $g$ between which the block is bolted by through bolts $h$. The bracket arms themselves may be fastened to the respective frame members $b$ by bolts $i$. The blocks are mounted at such an angle as to present their rear faces $f'$ to the rear surface of the gate $c$ in parallelism therewith when the gate is in its rearmost position. In this position the gate is held in spaced relationship to the angle piece $d$ so that danger of engagement therewith is eliminated. Further, since the stops are disposed some distance from the hinge point $c'$ the leverage of any forces applied to the gate near its end is reduced as much as possible. Blows on the gate are cushioned by the yielding stops so that liability of injury and breakage is reduced.

Changes in details of construction and the manner of mounting the improved stops may be made without departing from the spirit of the invention.

What I claim is:

1. In combination with the tail gate of a vehicle body and a frame for supporting the vehicle body, yielding limit stops for the gate mounted on the frame, said stops comprising blocks of non-metallic yielding material presenting relatively large superficial bearing surfaces to the gate and means for mounting the same on the frame members of the vehicle.

2. In combination with a vehicle frame including spaced side frame members, a body mounted on the frame, a tail gate hinged on the body, a stop for the tail gate comprising a block of rubber, bracket pieces between which the block is supported, and means to secure the bracket pieces between the spaced side frame members.

This specification signed this 26th day of March A. D. 1924.

FRANK PAMPINELLA.